(12) United States Patent
Holmes

(10) Patent No.: US 7,540,060 B2
(45) Date of Patent: Jun. 2, 2009

(54) MIRROR WITH WIPER FOR TRUCK

(76) Inventor: Nathan Holmes, 2389 Bayside Dr., Apt. 2004, Hilliard, OH (US) 43026

( * ) Notice: Subject to any disclaimer, the term of this patent is extended or adjusted under 35 U.S.C. 154(b) by 0 days.

(21) Appl. No.: 11/784,623

(22) Filed: Apr. 9, 2007

(65) Prior Publication Data
US 2007/0234500 A1 Oct. 11, 2007

Related U.S. Application Data

(60) Provisional application No. 60/790,156, filed on Apr. 7, 2006.

(51) Int. Cl.
B60S 1/60 (2006.01)
B60S 1/44 (2006.01)
B60S 1/20 (2006.01)

(52) U.S. Cl. .............. 15/250.003; 15/250.29; 15/250.24; 15/250.01; 359/850; 359/855; 359/865; 359/872

(58) Field of Classification Search ............ 15/250.003, 15/250.3, 250.31, 250.27, 250.24, 250.29, 15/250.01; 359/850, 855, 865, 872
See application file for complete search history.

(56) References Cited

U.S. PATENT DOCUMENTS

| | | | | |
|---|---|---|---|---|
| 3,289,237 A | * | 12/1966 | Lindsey | ............. 15/250.24 |
| 3,712,715 A | * | 1/1973 | Wagner | ............. 359/855 |
| 3,795,936 A | * | 3/1974 | Lane et al. | ............. 15/250.24 |
| 3,825,324 A | | 7/1974 | Brewington | |
| 3,936,158 A | | 2/1976 | Cianciolo et al. | |
| 4,306,328 A | * | 12/1981 | Layton | ............. 15/250.003 |
| 4,763,381 A | * | 8/1988 | Williams | ............. 15/250.01 |
| 4,870,713 A | | 10/1989 | Raynor | |
| 5,295,021 A | * | 3/1994 | Swanson | ............. 359/850 |
| 5,406,419 A | | 4/1995 | Mackey | |
| 5,412,512 A | | 5/1995 | Zebold et al. | |
| 5,721,646 A | * | 2/1998 | Catlin et al. | ............. 359/865 |
| 5,760,956 A | | 6/1998 | Maccan | |
| 5,760,978 A | * | 6/1998 | Smith | ............. 359/855 |
| 6,343,402 B1 | * | 2/2002 | Smith et al. | ............. 15/250.3 |
| 6,654,982 B1 | | 12/2003 | Cowen | |
| 6,962,422 B1 | * | 11/2005 | Englander | ............. 359/864 |

FOREIGN PATENT DOCUMENTS

WO 2005/019006 * 3/2005

* cited by examiner

*Primary Examiner*—Gary K Graham
(74) *Attorney, Agent, or Firm*—James Ray & Assoc.

(57) ABSTRACT

A side mirror assembly for a truck has a housing retaining an upper mirror, a central mirror, and a lower mirror, each of which is motorized and independently adjustable. The assembly also includes a chain driven wiper blade that will wipe across all three mirrors, and a dispenser for dispensing washer fluid on the mirrors. Around the perimeter of the housing are one or more connectors to with electrical devices attachable to the mirror housing can be connected.

6 Claims, 6 Drawing Sheets

MIRROR WITH WIPER FOR TRUCK

CROSS REFERENCE TO RELATED APPLICATIONS

This application is closely related to and claims benefit from U.S. Provisional Application Ser. No. 60/790,156 filed Apr. 7, 2006.

FIELD OF INVENTION

The present invention relates to truck mirrors and, in particular, to an improved mirror having multiple independently adjustable mirror portions positioned one vertically above another.

BACKGROUND OF THE INVENTION

Truck drivers have little visibility behind their vehicles because the enclosed truck bed obstructs the driver's vision. Truck drivers normally have enlarged mirrors positioned on each side of the bed. The side mirrors are elongate having a width of about five inches and an overall height of about fifteen inches but, despite their size, it is difficult for a driver to see around the obstruction of the truck bed to see vehicles beside and behind the truck. A driver's visibility can be further reduced when the surface of the mirrors is obstructed by rain or snow falling on the mirror surface or mud thrown up from the roadway.

Truckers have also found that the structure that supports side mirrors can also be used to support CB antennas and satellite mounts which are used while the vehicle is parked. Such electronic devices require a connection to electronic devices within the cab of the truck which require unsightly wires extending through the truck window to utilize the advantages of a mirror mount.

SUMMARY OF THE INVENTION

Briefly, the present invention is embodied in a motorized mirror assembly for use on vehicles such as trucks. The assembly includes a housing suitable for receiving brackets for attachment to a truck. Mounted in vertical sequence within the housing are pivot mounts for independently aligning three mirrors in stack relationship including an upper mirror, a central mirror, and a lower mirror. It is preferable that the upper mirror and lower mirror be somewhat smaller than the central mirror so that the central mirror offers the images presently available to truck drivers using conventional unitary mirrors. In the preferred embodiment, all three of the mirrors are motorized using conventional motors and adjustment technology so that each of the three mirrors can be independently aligned to provide maximum visibility from the driver's seat. The lower mirror, for example, can be positioned so that the driver can see the wheels of his own vehicle and to some extent can see under the rear portion of his vehicle to catch a glimpse of any following automobile. The driver will position the central mirror much like conventional mirrors to provide a general view of side traffic. The upper mirror is positioned somewhat differently from the central mirror so as to allow the driver to see over the roofs of side traffic to see potential problems arising from behind as the truck proceeds down the road.

To melt ice and snow which may accumulate on the surface of the mirror, a heating element is provided along the rear surface of the mirror such that the driver can apply heat to the glass of the mirror as needed to melt any accumulated ice or snow. A motorized wiper having a chain drive is also provided for wiping the mirrored surfaces. In the preferred embodiment, the wiper extends horizontally across the width of the mirror with each end of the wiper attached to a chain drive with both chains driven by a single electric motor. When the electric motor is energized, the two chains operate in parallel causing the wiper to move vertically across the surfaces of the mirrors from the bottom to the top, then reversing direction and returning to the bottom. The wiping cycle should always end with the wiper in its lowest position adjacent the lower edge of the lower mirror. The wiper could also be configured to move horizontally across the mirror from left to right or right to left. Preferably, the controls permit the driver to select between a single wiper cycle or continuous operation of the wiper. The wiper assembly further includes a container of washer fluid and a motorized dispensing device to permit the driver to selectively spray wiper fluid on the surface of the mirror.

Finally, in the preferred embodiment, the mirror has one or more sets of wires extending to the housing with connectors built around the perimeter of the housing for receiving suitable electric connectors for an antenna, a satellite dish, a light, or any other apparatus requiring an electric attachment.

BRIEF DESCRIPTION OF THE DRAWINGS

A better understanding of the present invention will be had after a reading of the following detailed description taken in conjunction with the drawings wherein.

DETAILED DESCRIPTION OF PREFERRED EMBODIMENT

Figure 1:
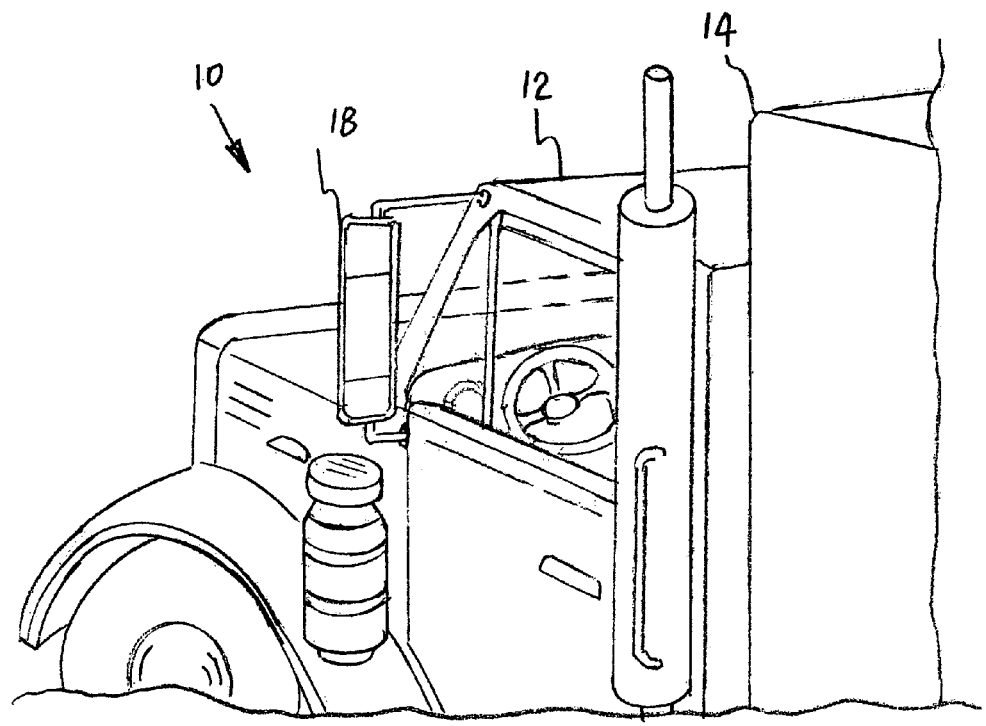
FIG. 1 is a side elevational view of a truck tractor and semi-trailer having a mirror attached thereto in accordance with the present invention.
Figure 2:
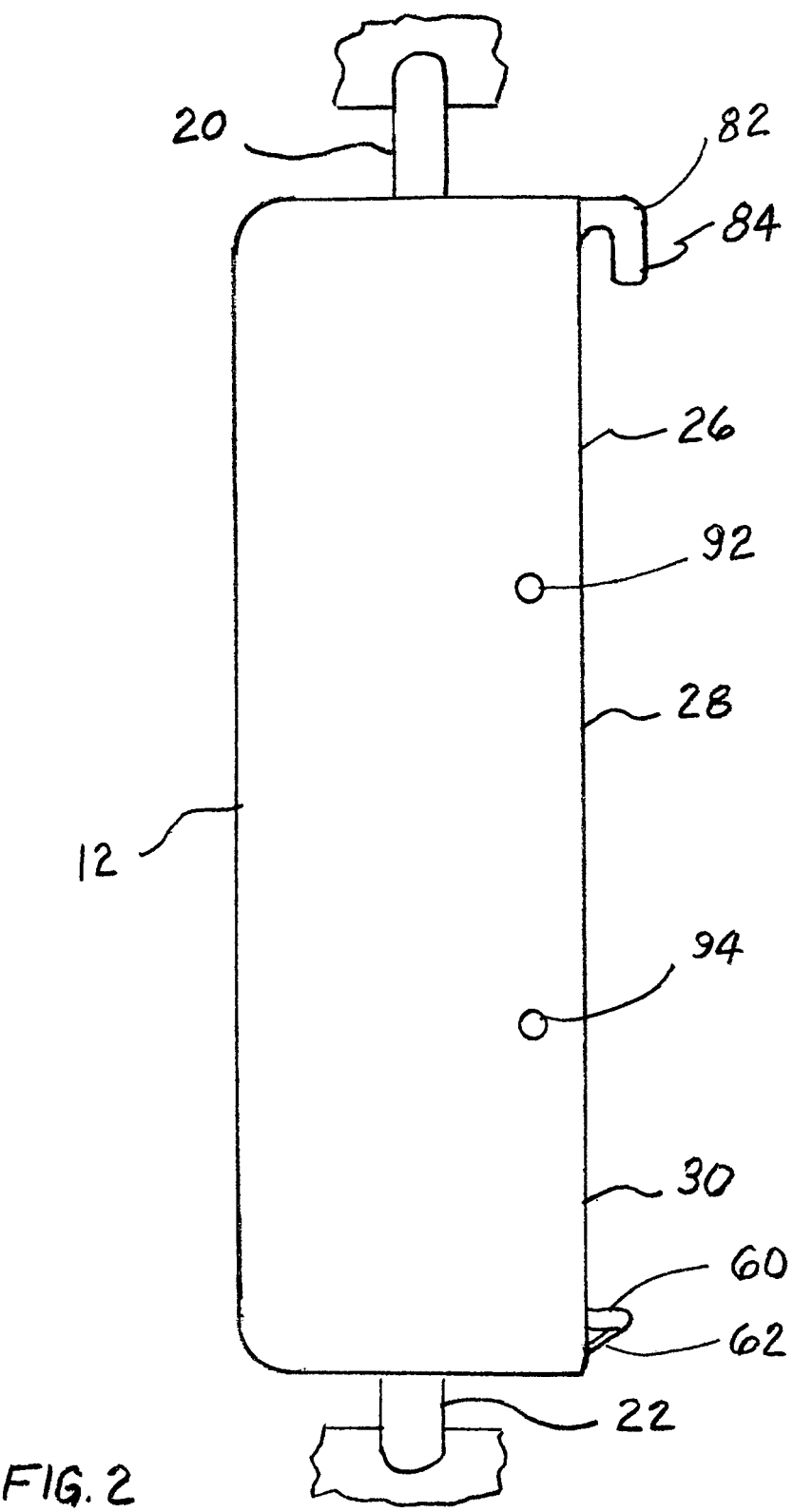
FIG. 2 is an enlarged side elevational view of the mirror attached to the cab of the tractor in FIG. 1.
Figure 3:
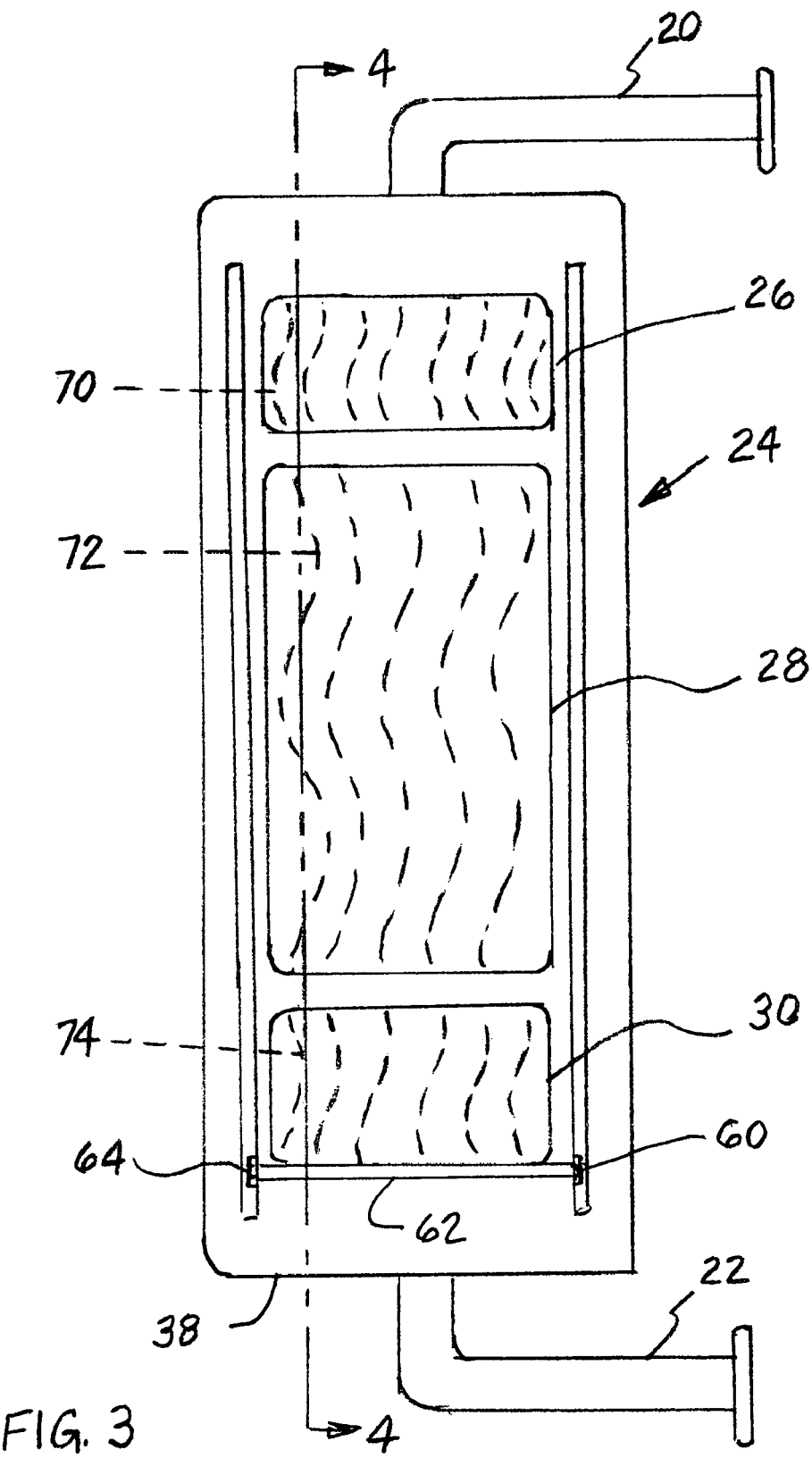
FIG. 3 is a front view showing the face of the mirror shown in FIG. 2.

Referring to FIGS. 1 through 3, a truck 10 has a tractor with a cab 12 and a trailer 14 with rear wheels 16. Mounted on the cab 12 just forward of the door is a mirror 18 in accordance with the present invention. The mirror 18 is attached to the cab 12 by upper and lower connection bars 20, 22. The mirror 18 includes a housing 24 made of suitable material such as plastic or metal to protect vital components therein and has a viewing surface consisting of three mirror portions, an upper mirror 26, below that a central mirror 28, and below the central mirror 28 a lower mirror 30.

Figure 6:
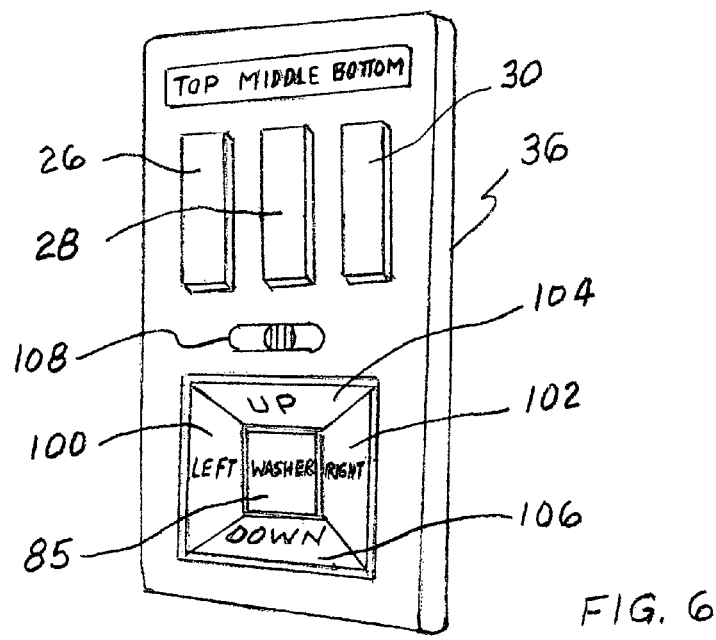
FIG. 6 is a front elevational view of a control panel for use with the mirror shown in FIG. 2.
Figure 4:
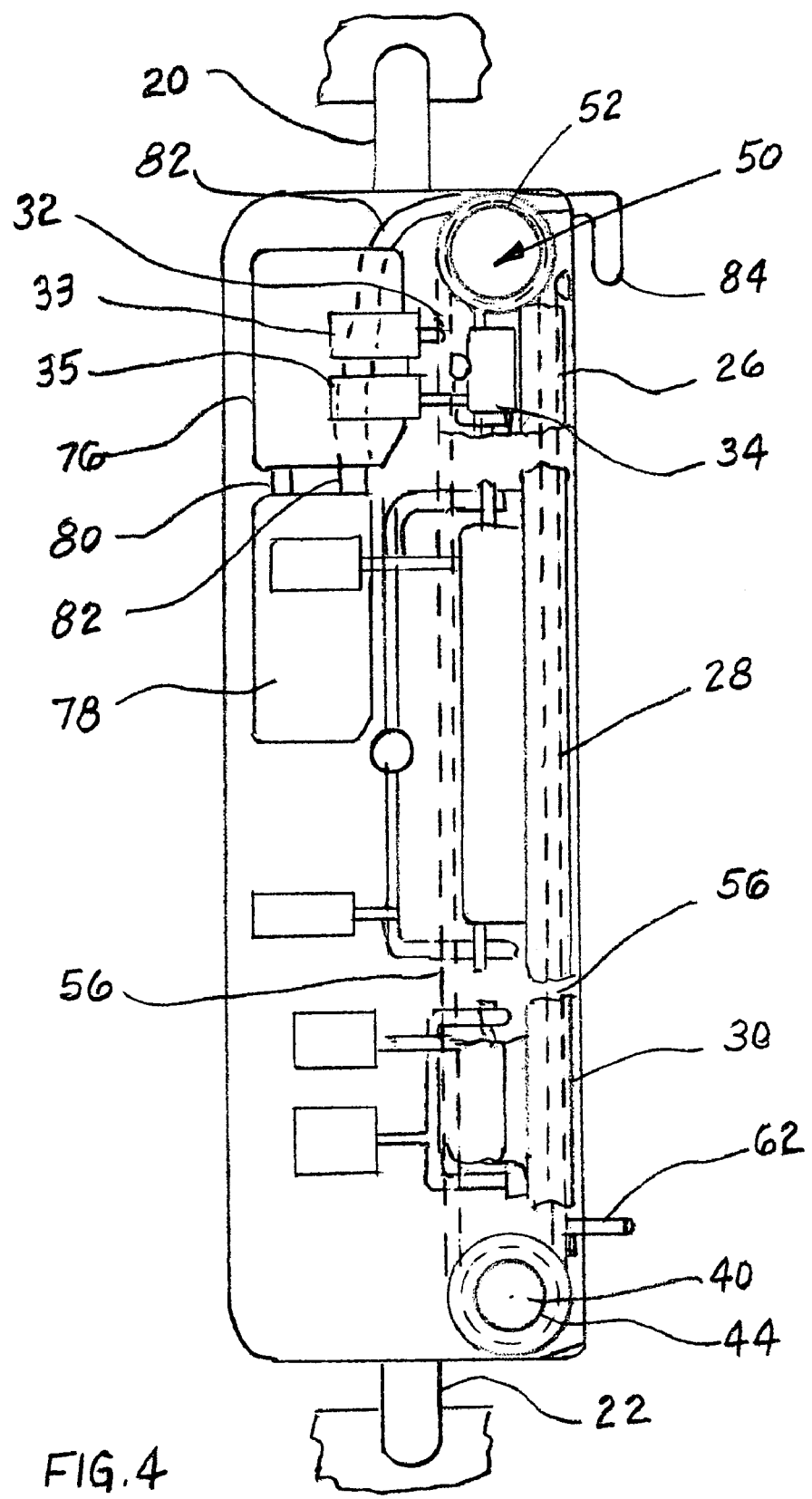
FIG. 4 is a cross-sectional view of the mirror taken through lines 4-4 as shown in FIG. 3.
Figure 5:
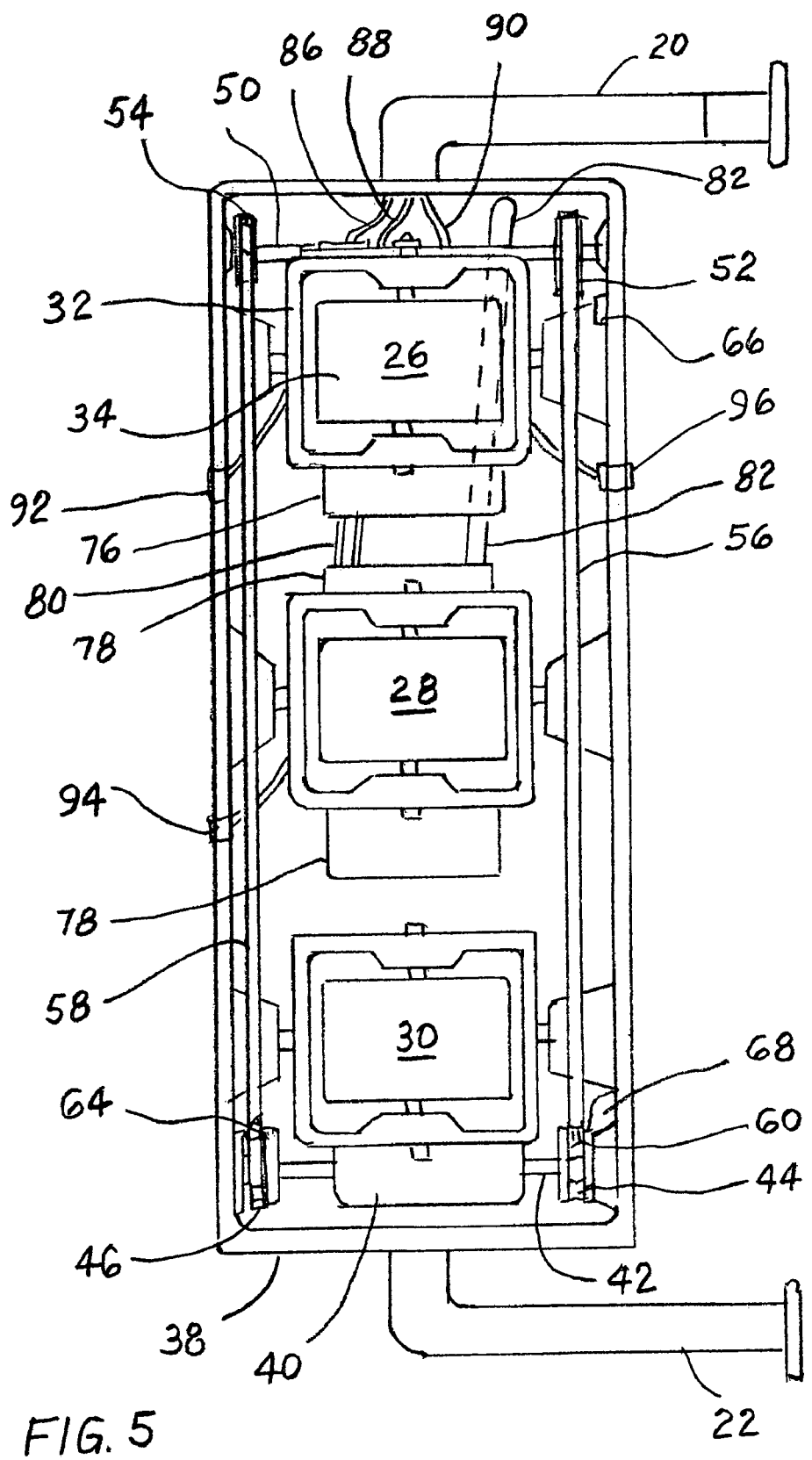
FIG. 5 is a front view of the mirror assembly as shown in FIG. 3 but with the glass and the mirror removed to show the inner components thereof.

As best seen in FIGS. 4, 5 and 6, the upper mirror 26 is mounted to the housing 24 by first and second moveable frames 32, 34 only portions of which are visible. One of the frames 32 permits the upper mirror 26 to be rotatable within the housing 24 about a vertical axis and the second frame 34 permits rotation of the mirror 26 about a horizontal axis. Both frames 32, 34 are motorized by miniature motors 33, 35 respectively, shown only in FIG. 6, of the type commonly known for controlling mirrors. In similar fashion, each of the central mirror 28 and the lower mirror 30 are mounted on similar pairs of frames, not shown, and driven by motors, unnumbered but shown in FIG. 6. Accordingly, the three mirrors 26, 28, 30 can be independently adjusted from a control panel 36, shown in FIG. 6, operable by the truck driver by inside the cab 12.

Referring to FIGS. 4 and 5, extending along the lower edge 38 of the housing 24 is a miniature electric drive motor 40 that rotates a shaft 42 having a first sprocket 44 at one end thereof and a second sprocket 46 at the opposite end thereof, with both sprockets 44, 46 locked for rotation with the drive shaft 42. Extending along the inner upper edge of the housing 24 is an idler shaft 50 having idler sprockets 52, 54 at the opposite ends thereof. Extending around first drive sprocket 44 and idler sprocket 52 is a first chain 56, and extending around the second drive sprocket 46 and idler sprocket 54 is a second chain 58. Accordingly, the two chains 56, 58 are moved in unison by the operation of the motor 40. One link of chain 56 has a metal projection 60 welded thereto to which is attached one end of a wiper blade 62, and the opposite end of the wiper blade 62 is attached to a projection 64 welded to a link on a second chain 58. It should be appreciated that the projections 60, 64 are welded to links that are directly opposite each other such that the wiper 62 extends horizontally across the width of the mirror assembly 18. Positioned along the path of the first chain 56 near the idler shaft 50 is a first switch 66 which is actuated by the wiper blade 62 just as it reaches the upper end of its travel, and positioned along the path of the first chain 56 near the drive shaft 42 is a second switch 68 which is similarly actuated by the wiper blade 62 when it reaches the lower end of its travel.

Figure 7:
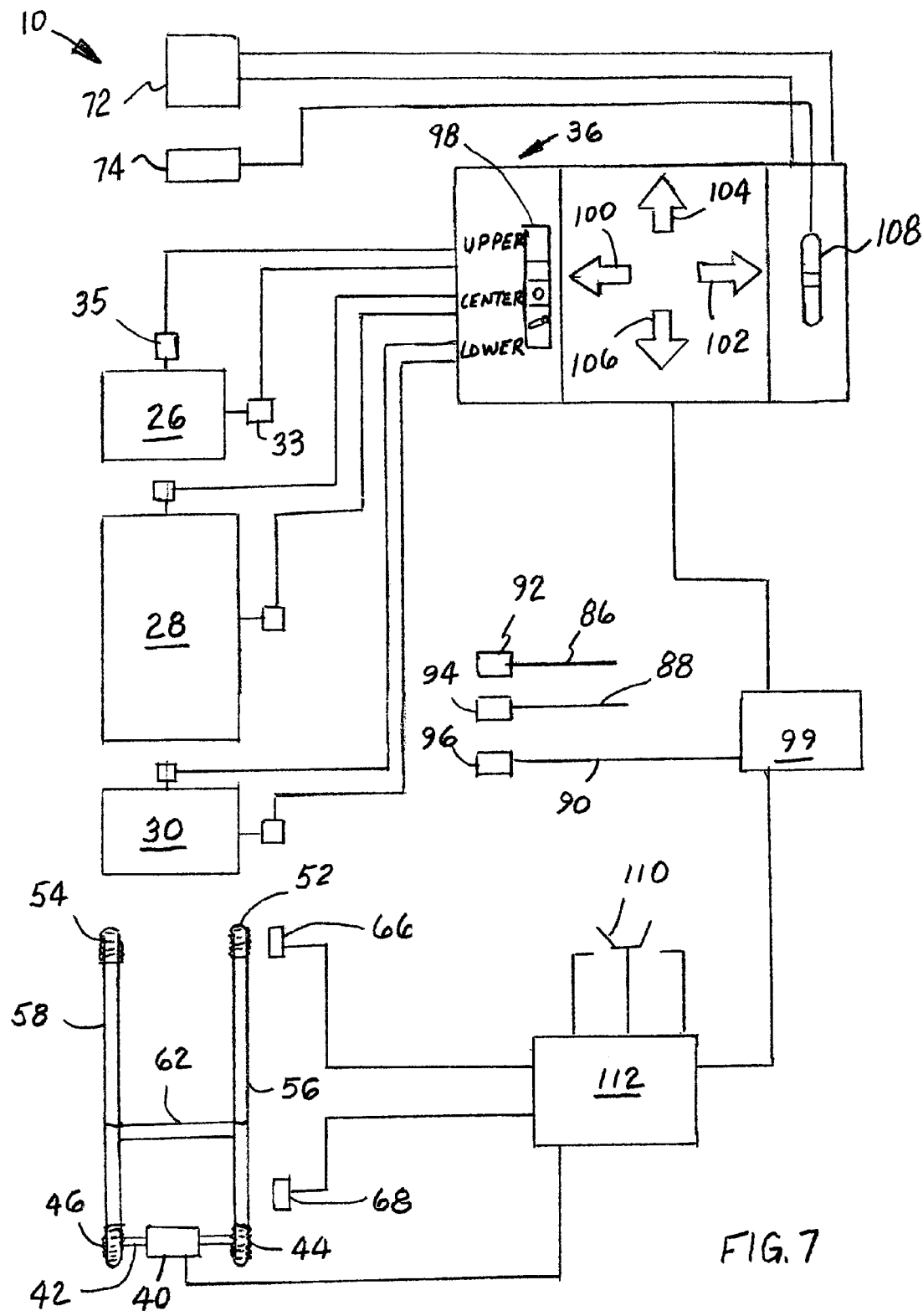
FIG. 7 is a block diagram of a circuit for operating the mirror shown in FIG. 2.

Referring to FIG. 3, the mirrored glass panels that make up the upper mirror 26, central mirror 28, and the lower mirror 30, each have electric heating elements 70, 72, 74 of the type known in the art connected to the rear surface thereof and visible in FIG. 3 in broken lines. Referring further to FIGS. 4 and 5, positioned in the housing 24 and behind the upper mirror 28 is a container 76 for containing a supply of washer fluid. Below the container 76 is a miniature pump 78 having an input that is fed by a fluid line 80 extending from the container 76. The pump 78 has a discharge line 82 that extends from the outlet of the pump 78 to an nozzle 84 near the top of the upper mirror 26 and is configured to spray washer fluid on the surface of the three mirrors 26, 28, 30. Referring to FIGS. 6 and 7, the pump 78 is energized by a switch 85 on the control panel 36 enabling the driver to dispense washer fluid as needed.

As best seen in FIGS. 4 and 5, extending through the bars 20, 22 attached to cab 12 are a plurality of wires 86, 88, 90, the ends of which are connected to connectors 92, 94, 96 that are accessible through apertures, unnumbered, in the body of the housing 24. Connector 92 is attached to one end of wire 86 and is suitable for receiving a connector of a CB antenna. The opposite end of wire 86 is connected to a CB set, not shown, in the cab 12 of the tractor 10. Connector 94 is attached to one end of wire 88 and is suitable for receiving a satellite dish, and the opposite end of wire 88 is connected to an onboard receiver, not shown. Connector 96 is attached to one end of wire 90 and is suitable for attaching an exterior lighting fixture. The opposite end of wire 90 is connected to the battery, shown as 99 in FIG. 6, in the tractor.

Referring to FIGS. 6 and 7, the control panel 36 has a selector switch 98 for selectively connecting the power lines from the battery 99 to the electric motors, not shown, of one of the three mirrors 26, 28, 30. The panel 36 also has left-right controls 100, 102 and up-down controls 104, 106 for operating the electric motors that horizontally and vertically adjust the moveable frames 32, 34 of the various mirrors 26, 28, 30. Each of the mirrors can therefore be independently adjusted to maximize a driver's visibility. The control panel 36 also includes a switch 108 for applying electric power to the heating elements 70, 72, 74 for melting snow or ice accumulated on the surface of the mirrors 26, 28, 30.

A selector switch 110 directs a microprocessor 112 to apply power to the electric motor 40 for driving the wiper blade 62. The microprocessor 112 receives information from the first and second switches 66, 68 at the upper and lower ends of the wiper movement and from the selector switch 110. The actuating lever of the switch 110 is moveable between two positions. When the lever is moved to the left to instruct the microprocessor drives the wiper blade 62 through a single up-down cycle, and when it is moved to the right the microprocessor continuously cycles the wiper blade 62. More specifically, when the switch 110 is moved to the left, the microprocessor 112 will energize the motor 40 to drive the wiper blade 62 from its initial position at the bottom of the lower mirror 30 causing it to move upwardly across the surface of the mirrors until it has reached the upper end of its travel at which point the second switch 68 will be actuated. Upon activation of the second switch 68, the motor 40 will be reversed causing the wiper blade 62 to move downwardly until the wiper blade 62 actuates the first switch 66 at which point the microprocessor 112 will terminate power to the motor 40. When the switch 110 is moved to the continuous operating position, the microprocessor 112 will reverse the power to the motor 40 when the wiper blade 62 actuates the first switch 66 thereby causing the wiper 62 to begin another cycle.

Accordingly, there has been disclosed an improved mirror assembly for use by truckers. It will enable truckers to maximize their view of traffic from behind regardless of weather or circumstances.

While the present invention has been described with respect to a single embodiment, it will be appreciated that many modifications and variations can be made without departing from the true spirit and scope of the invention. It is therefore the intent of the appended claims to cover all such modifications and variations that fall within the true spirit and scope of the invention.

What is claimed:

1. A mirror assembly for use on a vehicle, said mirror assembly comprising:
   a housing attached to said vehicle,
   a central mirror movably mounted on said housing,
   an upper mirror movably mounted on said housing above said central mirror, and
   a lower mirror movably mounted on said housing below said central mirror said mirrors each being independently movable with respect to one another, and
   a driven wiper on said housing adjacent a bottom surface of said lower mirror for wiping a surface of each of said central mirror, said upper mirror, and said lower mirror, said wiper movable in a vertical path beginning at a bottom edge of said lower mirror and moving upwardly across said central mirror to a top edge of said upper mirror and downwardly to a bottom edge of said lower mirror, a motor drives the wiper in reciprocating fashion between the bottom and top edges, said motor drives a pair of spaced flexible and continuous driving members in a reciprocating fashion via a pair of sprockets, each driving member having a pair of laterally spaced, substantially parallel lengths.

2. The mirror assembly of claim 1 and further comprising
a connector on said housing for receiving a connector to an electric device attachable to said housing, and
a wire extending through said housing to said connector.

3. The mirror assembly of claim 1 and further comprising
a first motorized control for controlling said central mirror,
a second motorized control for controlling said upper mirror, and
a third motorized control for controlling said lower mirror.

4. The mirror assembly of claim 1 and further comprising
a washer fluid well in said housing for retaining liquid washer fluid, and
a dispensing pump on said housing connected to said washer fluid well for dispensing washer fluid on one of said central mirror, said upper mirror, and said lower mirror.

5. The mirror assembly of claim 4 and further comprising
a chain drive connecting said motor to said wiper.

6. The mirror assembly of claim 5 and further comprising
a connector on said housing for receiving a connector to an electric device attachable to said housing, and
a wire extending through said housing to said connector.

\* \* \* \* \*